(12) United States Patent
Atsuchi et al.

(10) Patent No.: US 8,277,555 B2
(45) Date of Patent: Oct. 2, 2012

(54) COATING COMPOSITION

(75) Inventors: Mikito Atsuchi, Ohta-ku (JP); Akira Mochizuki, Nagoya (JP); Minoru Naitoh, Nagoya (JP)

(73) Assignee: Dyflex Corporation, Tokyo (JP)

( * ) Notice: Subject to any disclaimer, the term of this patent is extended or adjusted under 35 U.S.C. 154(b) by 977 days.

(21) Appl. No.: 11/658,684

(22) PCT Filed: Feb. 25, 2005

(86) PCT No.: PCT/JP2005/003141
§ 371 (c)(1),
(2), (4) Date: Aug. 6, 2009

(87) PCT Pub. No.: WO2006/011259
PCT Pub. Date: Feb. 2, 2006

(65) Prior Publication Data
US 2009/0293768 A1    Dec. 3, 2009

(30) Foreign Application Priority Data

Jul. 28, 2004  (JP) .................................. 2004-220691

(51) Int. Cl.
*C09D 183/08* (2006.01)
(52) U.S. Cl. .................................. 106/287.11
(58) Field of Classification Search ............... 106/287.11
See application file for complete search history.

(56) References Cited

U.S. PATENT DOCUMENTS

| | | | | |
|---|---|---|---|---|
| 5,707,434 A * | 1/1998 | Halloran et al. | ......... | 106/287.11 |
| 5,707,435 A * | 1/1998 | Halloran | ................... | 106/287.11 |
| 5,804,616 A * | 9/1998 | Mowrer et al. | ................ | 523/421 |
| 5,885,341 A * | 3/1999 | Standke et al. | .......... | 106/287.11 |
| 6,534,667 B1 * | 3/2003 | Standke et al. | ................ | 556/413 |
| 7,026,398 B2 * | 4/2006 | Monkiewicz et al. | ........ | 525/100 |

FOREIGN PATENT DOCUMENTS

| | | |
|---|---|---|
| JP | 62 190260 | 8/1987 |
| JP | 62 235361 | 10/1987 |
| JP | 5 247347 | 9/1993 |
| JP | 8 295826 | 11/1996 |
| JP | 2774235 | 4/1998 |
| JP | 10 509195 | 9/1998 |
| JP | 11 124544 | 5/1999 |
| JP | 2000 63612 | 2/2000 |
| JP | 2000 265061 | 9/2000 |
| JP | 3263331 | 12/2001 |
| JP | 2003 64301 | 3/2003 |
| JP | 2003 213199 | 7/2003 |
| JP | 2003 238895 | 8/2003 |
| JP | 2003 277683 | 10/2003 |
| JP | 2004 51943 | 2/2004 |

* cited by examiner

Primary Examiner — David M Brunsman
(74) Attorney, Agent, or Firm — Oblon, Spivak, McClelland, Maier & Neustadt, L.L.P.

(57) ABSTRACT

A coating composition which is excellent in crack resistance, alkali resistance and solvent resistance while having a high hardness and which is excellent in recoatability, anti-graffiti property, and removability of graffiti is provided. The coating composition according to the present invention comprises as the essential components, (a) a liquid organosiloxane compound which is a mixture of (a-1) a liquid organosiloxane compound having an alkoxy group content of 20 to 60% by mass and (a-2) a liquid organosiloxane compound having an alkoxy group content of 5% by mass or more and less than 20% by mass, in which an (a-1)/(a-2) mass ratio is 10/90 to 60/40, (b) an organometallic catalyst, (c) at least one compound selected from among alkoxy group-containing organosilane compounds having a primary or secondary amino group, amino-modified silicone oils, and amino group-containing organosiloxane compounds, and (d) at least one compound selected from among compounds having two or more glycidyl groups in one molecule, glycidyl group-containing silane compounds and glycidyl group-containing silicone oligomers.

6 Claims, No Drawings

COATING COMPOSITION

This application is a 371 of PCT/JP05/03141 filed Feb. 25, 2005.

TECHNICAL FIELD

The present invention relates to a novel inorganic solvent-free ordinary temperature curable coating composition and the use thereof, and more particularly, it is useful to provide a coating composition in which disadvantages of a coating film of a conventional inorganic solvent-free ordinary temperature curable coating composition such that it is hard and liable to crack and has poor alkali resistance are improved, and which can form a coating film excellent in crack resistance while having a high hardness, and is excellent in alkali resistance and solvent resistance, and moreover, is excellent in recoatability, anti-graffiti property and removability of graffiti.

BACKGROUND ART

Heretofore, as an inorganic solvent-free ordinary temperature curable coating composition excellent in weather resistance and heat resistance, a solvent-free ordinary temperature curable organosiloxane composition (Patent document 1), an organosiloxane liquid composition (Patent document 2) and the like are known. These are coating compositions capable of providing a coating film excellent in heat resistance and weather resistance, and in terms of flex resistance (deflection resistance), they are supposed to endure bending around a round bar with a shaft diameter of 3 mm or 10 mm. However, this was determined at the time when the material age was 5 to 7 days at 25° C. The curing thereof proceeds further as time proceeds, and in an accelerated weather resistance test or a humidity and cool-heat cycling test, significant cracks are formed in the coating film and they have poor crack resistance. Further, they have poor alkali resistance against a strong alkali at pH 12 or above.

Further, as a solvent-free ordinary temperature curable coating composition, a solvent-free two-liquid type ordinary temperature curable liquid polymer composition (Patent document 3) is known. Although this composition is excellent in crack resistance, it has poor weather resistance because it contains an acrylic resin at 12 to 22% by mass, and also it has poor anti-graffiti property and removability of graffiti.

Further, in the above Patent documents 1 to 3, there is no suggestion of a coating composition capable of forming a coating film with removability of graffiti.

On the other hand, organopolysiloxane curable compositions (Patent document 4 and Patent document 5) are also known as an inorganic ordinary temperature curable coating composition excellent in crack resistance and stain resistance. However, it is obvious from Examples and the like that either of them contains a solvent upon coating, and they are different in terms of the technical idea that a solvent-free type is provided in order to reduce the environmental burden and decrease the influence thereof on the human body and health as much as possible at which the present invention aims.
Patent document 1: Japanese Patent No. 2137192
Patent document 2: Japanese Patent No. 2774235
Patent document 3: Japanese Patent No. 3263331
Patent document 4: JP-A-2000-63612
Patent document 5: JP-A-2003-238895

DISCLOSURE OF THE INVENTION

Problems that the Invention is to Solve

The present invention provides a coating composition which is a solvent-free type, and excellent in crack resistance, alkali resistance, solvent resistance, stain resistance, drying property and so on. Further, it provides a coating composition capable of forming a coating film which is excellent in recoatability, removability of graffiti and anti-graffiti property.

Means for Solving the Problems

In order to achieve the above objects, the present invention includes the following respective inventions.

(1) A coating composition comprising the following components (a), (b), (c) and (d) as the essential components:

(a) a liquid organosiloxane compound which is a mixture of (a-1) a liquid organosiloxane compound having an alkoxy group content of 20 to 60% by mass and (a-2) a liquid organosiloxane compound having an alkoxy group content of 5% by mass or more and less than 20% by mass, in which an (a-1)/(a-2) mass ratio is 10/90 to 60/40;

(b) an organometallic catalyst;

(c) at least one compound selected from among alkoxy group-containing organosilane compounds having a primary or secondary amino group, amino-modified silicone oils, and amino group-containing organosiloxane compounds; and (d) at least one compound selected from among compounds having two or more glycidyl groups in one molecule, glycidyl group-containing silane compounds and glycidyl group-containing silicone oligomers.

(2) The coating composition according to (1), further comprising at least one compound of (e) a compound selected from the group consisting of fluorine-containing silanes, alkylalkoxysilane-based water repellent agents, silicone oil-based water repellent agents, hydroxy-modified silicones and silicones for release paper; and (f) a compound selected from among titanium oxides, color pigments, extender pigments, thixotropic agents, thickening agents, wetting agents, dispersing agents, antifoaming agents, antifungal agents and antialgal agents in addition to the components (a), (b), (c) and (d).

(3) The coating composition according to (1) or (2), wherein the component (a) is a mixture having an alkoxy group content of 5 to 60% by mass.

(4) The coating composition according to any one of (1) to (3), wherein the component (b) is an organotin-based metallic catalyst.

(5) The coating composition according to any one of (1) to (4), characterized by containing the component (a) at 50 to 90% by mass, the component (b) at 0.1 to 10% by mass, the components (c) and (d) at 5 to 50% by mass, and the component (e) at 1 to 20% by mass.

(6) The coating composition according to any one of (1) to (5), which is a two-liquid type coating composition in which the first liquid contains the component (a) and the component (c), the second liquid contains the component (b) and the component (d), and either the first liquid or the second liquid contains a compound selected from among the component (e) and the component (f).

(7) The coating composition according to any one of (1) to (5), which is a two-liquid type coating composition in which the first liquid contains the component (b) and the component (c), the second liquid contains the component (a) and the component (d), and either the first liquid or the second liquid contains a compound selected from among the component (e) and the component (f).

(8) An anti-graffiti coating film formed by applying the coating composition according to any of (1) to (7) and curing it.

Effects of the Invention

The coating composition of the present invention is a coating composition which is a solvent-free type, and excellent in crack resistance, alkali resistance, solvent resistance, stain resistance, drying property and so on, and is capable of forming a coating film which is excellent in recoatability, removability of graffiti and anti-graffiti property. According to the coating composition of the present invention, a coating composition capable of forming a coating film which is excellent in crack resistance, alkali resistance, solvent resistance, adhesive property, drying property, anti-graffiti property and removability of graffiti, which could not be achieved by the conventional inorganic solvent-free ordinary temperature curable coating composition, can be provided.

BEST MODE FOR CARRYING OUT THE INVENTION

The coating composition of the present invention is a coating composition comprising as the essential components, (a) a liquid organosiloxane compound having an alkoxy group content of 5 to 60% by mass, (b) an organometallic catalyst, (c) at least one compound selected from among alkoxy group-containing organosilane compounds having a primary or secondary amino group, amino-modified silicone oils, and amino group-containing organosiloxane compounds, and (d) at least one compound selected from among compounds having two or more glycidyl groups in one molecule, glycidyl group-containing silane compounds and glycidyl group-containing silicone oligomers, and further comprising as a component to be added as needed, (e) one or more compounds selected from the group consisting of fluorine-containing silanes, alkylalkoxysilane-based water repellent agents, silicone oil-based water repellent agents, hydroxy-modified silicones and silicones for release paper, and/or (f) one or more compounds selected from among titanium oxides, color pigments, extender pigments, thixotropic agents, thickening agents, wetting agents, dispersing agents, antifoaming agents, antifungal agents and antialgal agents.

In the coating composition of the present invention, as the component (a), in order to keep the balance of curing reactivity and crack resistance, workability and the like, it is preferred that (a-1) a liquid organosiloxane compound having an alkoxy group content of 20 to 60% by mass and (a-2) a liquid organosiloxane compound having an alkoxy group content of 5% by mass or more and less than 20% by mass are used in combination. That is, in the case of only the component (a-1), the reactivity is fast and a resulting coating film is hard and liable to crack in some cases. On the other hand, in the case of only the component (a-2), although a resulting coating film is less likely to crack, the reactivity is slow and it has a problem in the workability such as a drying property in some cases.

Here, specific examples of the component (a) include methyl silicone oligomers, methyl phenyl silicone oligomers and phenyl silicone oligomers, however, it is not limited to these.

A curing catalyst to be used as the component (b) in the coating composition of the present invention is an organometallic compound, and specifically, a metal alkoxide compound, a metal chelate compound, a metal ester compound and a metal silicate compound of Ti, Al, Zr, Sn or the like can be used.

Examples of the metal alkoxide compound of the component (b) include the following compounds:

(1) aluminum alkoxides such as aluminum trimethoxide, aluminum triethoxide, aluminum tri-n-propoxide, aluminum triisopropoxide, aluminum tri-n-butoxide, aluminum tri-isobutoxide, aluminum tri-sec-butoxide, and aluminum tri-tert-butoxide;

(2) titanium alkoxides such as tetramethyl titanate, tetraethyl titanate, tetra-n-propyl titanate, tetraisopropyl titanate, tetra-n-butyl titanate, tetra-tert-butyl titanate, tetra-n-hexyl titanate, tetraisooctyl titanate, and tetra-n-lauryl titanate;

(3) zirconium alkoxides such as tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-tert-octyl zirconate, and tetra-n-stearyl zirconate; and (4) tin alkoxides such as dibutyltin dibutoxide.

Examples of the metal chelate compound of the component (b) include the following compounds:

(1) aluminum chelate compounds such as tris(ethyl acetoacetate)aluminum, tris(isopropyl acetate)aluminum, tris(n-butyl acetoacetate) aluminum, isopropoxybis(ethyl acetoacetate)aluminum, tris(acetyl acetonate)aluminum, tris(propynyl acetonate) aluminum, di-isopropoxy propionyl acetonate aluminum, acetyl acetonate bis(propionyl acetonate)aluminum, acetyl acetonate aluminum di-sec-butylate, methyl acetoacetate aluminum-sec-butylate, di(methyl acetoacetate) mono-tert butylate, diisopropoxy ethyl acetoacetate aluminum, and monoacetyl acetonate bis(ethyl acetoacetate)aluminum;

(2) titanium chelate compounds such as di-isopropoxy bis (ethyl acetoacetate) titanium, and di-isopropoxy bis(acetyl acetonate)titanium;

(3) zirconium chelate compounds such as tetrakis(acetyl acetonate)zirconium, and tributoxy(acetyl acetonate) zirconium;

(4) dibutyltin bis(acetyl acetonate) and the like.

Examples of the metal ester compound of the component (b) include titanium ester compounds such as polyhydroxy titanium stearate; zirconium ester compounds such as tributoxy zirconium stearate; tin ester compounds such as dibutyltin diacetate, dibutyltin di(2-ethylhexylate), dibenzyltin di(2-ethylhexylate), dibutyltin dioctoate, dibutyltin dilaurate, dibutyltin distearate, dibutyltin diisooctylmalate, dioctyltin diacetate, dioctyltin dilaurate, dioctyltin distearate and the like. Examples of the metal silicate compound include dibutyltin bis-trimethoxy silicate, dibutyltin bis-triethoxy silicate, dioctyltin bis-trimethoxy silicate and dioctyltin bis-triethoxy silicate.

These reaction catalysts of the component (b) can be used alone or in combination of two or more of them.

In particular, in order to increase the removability of graffiti with an oil-based marker, lacquer or the like, an organotin compound is preferably used.

In order to form a hybrid composite of the component (d) (a glycidyl group-containing compound) to be used for enhancing the crack resistance, alkali resistance, solvent resistance and adhesive property of the coating composition of the present invention and the component (a) (a silicone compound) for improving the uninflammability, weather resistance, stain resistance, heat resistance and the hardness of a resulting coating film, the component (c) (one or more compounds of alkoxy group-containing organosilane compounds having a primary or secondary amino group, amino-modified silicone oils and amino group-containing organosiloxane compounds) are used as the essential components. Further, a compound in which the above-mentioned amino group is masked for the purpose of preparing the coating composition of the present invention as a one-liquid type coating composition, achieving the storage stability or the like can also be preferably used.

Examples of the component (d) to be used in the coating composition of the present invention include diglycidyl ethers, diglycidyl esters, glycidyl group-containing silanes, epoxy-modified silicone oils, glycidyl group-containing silicone oligomers and the like, however, it is not limited to these.

The component (e) to be used as needed (one or more compounds selected from the group consisting of fluorine-containing silanes, alkylalkoxysilane-based water repellent agents, silicone oil-based water repellent agents, hydroxy-modified silicones and silicones for release paper) constitutes a coating composition excellent in an anti-graffiti property which prevents graffiti from being made because an oil-based marker or lacquer is repelled although the recoatability is poor. Further, it also provides an excellent anti-poster property.

The component (f) to be generally used in a coating composition is preferably added to the coating composition of the present invention according to the intended purpose.

In the coating composition of the present invention, it is preferred that the components (a) to (e) are blended at the following ratios:
(a): 50 to 90% by mass,
(b): 0.1 to 10% by mass,
(c)+(d): 5 to 50% by mass, and
(e): 1 to 20% by mass (if necessary).

To the above-mentioned coating composition, the component (f) can be added in a required amount according to the intended purpose.

The above-mentioned coating composition can be prepared as a one-liquid type coating composition, however, it is preferably prepared as a coating composition composed of two liquids in order to secure the storage stability, good workability and the like.

It can be prepared as a coating composition in which the components (a) and (c) are allowed to be contained in a first liquid, the components (b) and (d) are allowed to be contained in a second liquid, and the components (e) and (f) are allowed to be contained in either the first liquid or the second liquid. Alternatively, It can be prepared as a coating composition in which the components (b) and (c) are allowed to be contained in a first liquid, the components (a) and (d) are allowed to be contained in a second liquid, and the components (e) and (f) are allowed to be contained in either the first liquid or the second liquid.

The present invention will be described in more detail. The components (a), (c) and (d) that form a skeleton of a coating film made of the coating composition of the present invention have the following roles, respectively, in order for the formation of the skeleton, and appropriate blending amounts thereof are determined. That is, the component (a) is a main binder that forms a siloxane bond in a network structure, however, in order to preferably secure the workability, drying property and the like as the coating material and the performance of the coating film, the component (a) is preferably a mixture of (a-1) and (a-2), and the mixing ratio thereof is (a-1)/(a-2)=10/90 to 60/40 (mass ratio), preferably 20/80 to 50/50 (mass ratio).

The components (c) and (d) impart crack resistance, alkali resistance and solvent resistance to a coating film, and also forms a skeleton for enhancing an adhesive property to a base material or a substrate and the like. In order to react the components (c) and (d) with each other efficiently, it is preferred to add the component (c) in the range of 0.1 to 2 moles per one glycidyl group of the component (d).

As the curing catalyst (b), one or more compounds among the compounds described above are used, however, the present inventors found that an organotin-based catalyst is most suitable for the removability of graffiti particularly with an oil-based marker. The blending amount thereof is preferably in the range of 0.1 to 5% by mass of the composition.

The component (e) is used for enhancing the anti-graffiti property, and other than a silicone resin which is used in a common water repellent agent, mold release agent, mold release paper or the like, in particular, a fluorine-containing silane is preferably used because it can secure the persistence of the effect. The added amount thereof is preferably in the range of 1 to 20% by mass of the composition.

According to the intended purpose, the component (f) can be added to the coating composition of the present invention by a known method.

EXAMPLES

Hereinafter, the present invention will be described with reference to specific Examples, however, the invention is not limited to these Examples. Further, physical property evaluation methods for coating compositions to be employed in the respective Test examples, which are to be Examples and Comparative examples, are as described below. Incidentally, "parts" and "%" are "parts by mass" and "% by mass", respectively, unless otherwise specified.

<Crack Resistance>

Crack resistance was determined in accordance with JIS K 5600-7-4 (humidity and cool-heat cycling test). A test piece was immersed in water at 23° C. for 18 hours, and placed in a freezer at −20° C. for 3 hours and then heated at 50° C. for 3 hours. This procedure was repeated for 50 cycles, and the condition of the coating film after completion of the test was visually observed and the degree of crack, expansion and whitening in the coating film were evaluated at the following 3 levels. Incidentally, the test piece was prepared by coating a flexible board with a dimension of 70×70×6 mm with a coating composition using a brush such that the thickness of a dried coating film became 50 μm and curing it for 7 days under the conditions of 23° C. and 50% RH,
○: No change is observed in the coating film.
Δ: A crack is observed in a part of the coating film.
x: Significant cracks are observed in the coating film.

<Accelerated Weather Resistance>

An accelerated weather resistance test was carried out using an ultra-accelerated weatherometer (EYE Super UV Tester, manufactured by Iwasaki Electric Co., Ltd.). Test pieces were prepared by coating a flexible board with a dimension of 50×50×4 mm with a coating composition using a brush such that the thickness of a dried coating film became 50 μm followed by drying it for 7 days under the conditions of 23° C. and 50% RH. As the test conditions, the wavelength was set to 295 to 450 nm, the UV irradiation intensity was set to 100 mw/cm$^2$, the temperature of the black panel was set to 63° C. and the relative humidity was set to 50% RH, and one cycle consisted of irradiation for 4 hours and dew condensation for 4 hours, and the test was carried out for 125 cycles (1000 hours). After completion of the test, a gloss retention ratio to the 60-degree mirror surface initial glossiness of the coating film was obtained and evaluation was carried out at the following 3 levels.
○: Gloss retention ratio is 70% or more.
Δ: Gloss retention ratio is 50% or more and less than 70%.
x: Gloss retention ratio is less than 50%.

Further, appearance observation was carried out after the accelerated weather resistance test, and evaluation was carried out at the following 3 levels.
○: No change is observed in the coating film.
Δ: A crack is observed in a part of the coating film.
x: Significant cracks are observed in the coating film.

<Alkali Resistance>

An alkali resistance test was carried out as follows in accordance with JIS K 5600-6-1. A test piece was immersed under the condition of 23° C. for 7 days in a liquid prepared by dissolving sodium hydroxide in deionized water at 5 w/v %. After the immersion, the test piece was gently washed with running water and dried for 2 hours. Then, expansion, cracks, peeling-off, change in gloss in a coating film were visually observed and evaluation was carried out at the following 3 levels. Incidentally, the test pieces were prepared by coating a flexible board with a dimension of 150×70×4 mm with a coating composition using a brush such that the thickness of a dried coating film became 50 μm followed by drying it for 14 days under the conditions of 23° C. and 50% RH, ○: No significant change is observed compared with an untreated test piece.

Δ: Gloss deterioration is observed to a certain degree compared with an untreated test piece.

x: Significant gloss deterioration, cracks and peeling-off are observed compared with an untreated test piece.

<Adhesive Property>

An adhesion test was carried out as follows in accordance with the cross-cut method in JIS K 5600-5-6. Cuts were formed in a grid pattern (25 pieces: vertically divided into 5 parts and horizontally divided into 5 parts) using a cutter guide with a gap distance of 2 mm. Then, a cellophane adhesive tape was stuck on this grid pattern and rapidly peeled off in a direction perpendicular to the coated face by holding one end of the tape, and then the area of the peeled coating film was measured. Incidentally, the test pieces were prepared by coating a flexible board with a dimension of 150×70×4 mm with a coating composition using a brush such that the thickness of a dried coating film became 50 μm followed by drying it for 14 days under the conditions of 23° C. and 50% RH. The adhesive property was evaluated as follows from the area of the peeled coating film to the total area of the coating film.

○: The area of the peeled coating film is less than 5% of the total area.

Δ: The area of the peeled coating film is 5% or more and less than 35% of the total area.

x: The area of the peeled coating film is 35% or more of the total area.

<Forced Staining>

Test pieces were prepared by coating an aluminum board with a dimension of 150×70×0.8 mm with a coating composition using a brush such that the thickness of a dried coating film became 50 μm followed by drying it for 14 days under the conditions of 23° C. and 50% RH. Onto the obtained test piece, a carbon suspension (a dispersion obtained by adding glass beads to a mixture of 5 parts of carbon black manufactured by Degussa-Huls Corporation, Color Black FW200 and 95 parts of deionized water followed by dispersing the glass beads therein using a paint shaker for 2 hours) was applied using an air spray until the test piece was covered with it. Immediately thereafter, the test piece was dried at 60° C. for 1 hour. After the drying, the test piece was allowed to cool to room temperature, and the surface of the test piece was washed in running water using gauze until the staining substance did not come off. After the washing, the test piece was dried at room temperature for 3 hours, the degree of stain was measured using a color difference meter. Then, the lightness difference (ΔL*) of the coating film before and after the test was obtained and evaluation was carried out at the following 3 levels. Incidentally, it is indicated that as the lightness difference is smaller, the coating material is more excellent in stain resistance.

Lightness difference (ΔL*)=[lightness of coating film after test (L*1)−lightness of coating film before test (L*0)]

○: Lightness difference is −5 or more.

Δ: Lightness difference is −10 or more and less than −5.

x: Lightness difference is less than −10.

<Drying Property>

The evaluation of drying property can be carried out in accordance with finger-touch dryness in JIS K 5600-1-1. Incidentally, test pieces were prepared by coating a flexible board with a dimension of 150×70×4 mm with a coating composition using a brush such that the thickness of a dried coating film became 50 μm followed by drying it under the conditions of 23° C. and 50% RH. The center of the coated face was lightly touched with the tip of a finger, and the time until the finger was not stained was measured, and then evaluation was carried out at the following 3 levels.

○: Drying time is 4 hours or less: good drying property

Δ: Drying time is 4 hours or more and less than 8 hours: moderate drying property x: Drying time is 8 hours or more: poor drying property <Recoatability>

Test pieces were prepared by coating a flexible board with a dimension of 150×70×4 mm with a coating composition using a brush such that the thickness of a dried coating film became 50 μm followed by drying it for 7 days under the conditions of 50° C., and overcoating it again using a brush such that the thickness of a dried coating film became 50 μm and further drying it for 14 days under the conditions of 23° C. and 50% RH. An adhesion test was carried out as follows in accordance with the cross-cut method in JIS K 5600-5-6. Cuts were formed in a grid pattern (25 pieces: vertically divided into 5 parts and horizontally divided into 5 parts) using a cutter guide with a gap distance of 2 mm. Then, a cellophane adhesive tape was stuck on this grid pattern and rapidly peeled off in a direction perpendicular to the coated face by holding one end of the tape, and then the area of the peeled interface between the coating films was measured. The adhesive property was evaluated as follows from the area of the peeled interface between the coating films to the total area of the coating film.

○: The area of the peeled interface between the coating films is less than 5% of the total area.

Δ: The area of the peeled interface between the coating films is 5% or more and less than 35% of the total area.

x: The area of the peeled interface between the coating films is 35% or more of the total area.

<Anti-Graffiti Property and Removability of Graffiti>

The conditions at the time when graffiti was made on a test piece prepared in the evaluation of the forced staining with a commercially available water-based marker, oil-based marker, water-based spray, acrylic spray and lacquer spray and at the time when the graffiti was wiped away with a solvent (a mixed solvent of ethyl acetate and isopropyl alcohol at 1:1) were evaluated at the following 3 levels.

(Anti-Graffiti Property)

○: Graffiti cannot be made because a liquid is repelled (what was written cannot be made out).

Δ: There is a trace of graffiti (what was written can be roughly made out).

x: Graffiti can be made clearly.

(Removability of Graffiti)

○: When graffiti is wiped away with the solvent, a trace of graffiti does not remain.

Δ: When graffiti is wiped away with the solvent, a trace of graffiti remains.

x: When graffiti is wiped away with the solvent, the color blurs around the graffiti and the graffiti expands.

<Comprehensive Evaluation>

Based on the results of the performance measurements of the coating compositions shown above, the comprehensive evaluation of the coating compositions was carried out at the levels shown below.

○: A level in which it can be very preferably used as a coating composition.

Δ: A level in which it can be used as a coating composition, however, its application is limited in some cases.

x: A level in which it is difficult to use it as a coating composition.

The respective components used in the respective Test examples as Examples and Comparative examples are shown below.

As (a-1) of the component (a), a methyl silicone oligomer having an alkoxy-group content of 31%, "SR-2402" (manufactured by Toray Dow Corning Silicone Co., Ltd., hereinafter abbreviated as manufactured by TDS)

As (a-2) of the component (a), a methyl phenyl silicone oligomer having an alkoxy-group content of 18%, "DC-3074" (manufactured by TDS)

As (b-1) of the component (b), an organotin-based metallic catalyst "Neostann U-200" (manufactured by Nitto Kasei Co., Ltd.)

As (b-2) of the component (b), an organotitanium-based metallic catalyst "Orgatics TA-25" (manufactured by Matsumoto Chemical Industry Co., Ltd.)

As (c-1) of the component (c), an aminosilane containing a primary and secondary amino groups, "A-1120" (manufactured by Nippon Unicar Company Limited.)

As (c-2) of the component (c), an aminosilane containing a primary amino group, "A-1110" (manufactured by Nippon Unicar Company Limited.)

As (d-1) of the component (d), a diglycidyl ether having two glycidyl groups in the molecule, "ED-506" (manufactured by Asahi Denka Co., Ltd.)

As (d-2) of the component (d), a glycidyl group-containing silane having one glycidyl group in the molecule, "KBM-403" (manufactured by Shin-Etsu Chemical Co., Ltd.)

As the component (e), (e-1) a fluorine-containing silane, "KBM-7803" (manufactured by Shin-Etsu Chemical Co., Ltd.)

(e-2) a silicone-based water repellent agent, "FZ-3511" (manufactured by Nippon Unicar Company Limited.)

(e-3) a silicone for release paper, "KNS-316" (manufactured by Shin-Etsu Chemical Co., Ltd.)

(e-4) a fluorine-containing silicone oil "FL-10" (manufactured by Shin-Etsu Chemical Co., Ltd.)

As the component (f), (f-1) a titanium oxide, "R-706" (manufactured by Dupont Co.)

(f-2) a dispersing agent, "DISPERBYK 116" (manufactured by BYK-Chemie Co.)

(f-3) an antifoaming agent, "BYK-067" (manufactured by BYK-Chemie Co.)

The blending ratios in the coating compositions in which the above components were blended and the evaluation results of the test carried out by using the coating composition are shown in Table 1. Examples are shown in Test examples 1 to 9, and Comparative examples are shown in Test examples 10 to 13.

TABLE 1

| Component | | Test example 1 | Test example 2 | Test example 3 | Test example 4 | Test example 5 | Test example 6 | Test example 7 | Test example 8 | Test example 9 | Test example 10 | Test example 11 | Test example 12 | Test example 13 |
|---|---|---|---|---|---|---|---|---|---|---|---|---|---|---|
| a | (a-1) | 40.0 | 30.0 | 20.0 | 30.0 | 30.0 | 30.0 | 30.0 | 15.0 | 15.0 | 30.0 | 69.0 | 5.0 | 30.0 |
|   | (a-2) | 29.0 | 47.0 | 68.0 | 39.0 | 37.0 | 38.0 | 38.0 | 30.0 | 25.8 | 69.0 |     | 70.0 | 64.0 |
| b | (b-1) | 1.0 | 3.0 | 2.0 | 1.0 |     | 2.0 | 2.0 | 1.0 | 1.0 | 1.0 | 1.0 | 5.0 | 1.0 |
|   | (b-2) |     |     |     |     | 3.0 |     |     |     |     |     |     |     |     |
| c | (c-1) | 7.0 | 4.7 | 2.4 | 4.7 | 4.7 | 9.7 |     | 2.4 | 4.5 |     | 7.0 | 4.7 | 1.2 |
|   | (c-2) |     |     |     |     |     |     | 6.3 |     |     |     |     |     |     |
| d | (d-1) | 23.0 | 15.3 | 7.6 | 15.3 | 15.3 |     | 13.7 | 7.6 |     |     | 23.0 | 15.3 | 3.8 |
|   | (d-2) |     |     |     |     |     | 10.3 |     |     | 4.7 |     |     |     |     |
| e | (e-1) |     |     |     | 10.0 |     | 10.0 |     |     |     |     |     |     |     |
|   | (e-2) |     |     |     |     |     |     |     | 10.0 |     | 2.5 |     |     |     |
|   | (e-3) |     |     |     |     | 10.0 |     |     |     |     |     |     |     |     |
|   | (e-4) |     |     |     |     |     |     |     |     | 2.5 |     |     |     |     |
| f | (f-1) |     |     |     |     |     |     |     | 40.0 | 40.0 |     |     |     |     |
|   | (f-2) |     |     |     |     |     |     |     | 1.0 | 1.0 |     |     |     |     |
|   | (f-3) |     |     |     |     |     |     |     | 3.0 | 3.0 |     |     |     |     |
| Total | | 100.0 | 100.0 | 100.0 | 100.0 | 100.0 | 100.0 | 100.0 | 100.0 | 100.0 | 100.0 | 100.0 | 100.0 | 100.0 |
| Crack resistance | | ○ | ○ | ○ | ○ | ○ | ○ | ○ | ○ | ○ | X | X | ○ | X |
| Alkali resistance | | ○ | ○ | ○ | ○ | Δ | ○ | ○ | ○ | ○ | X | X | Δ | ○ |
| Solvent resistance | | ○ | ○ | ○ | ○ | ○ | ○ | ○ | ○ | ○ | ○ | ○ | X | ○ |
| Accelerated weather resistance — Gloss retention ratio | | ○ | ○ | ○ | ○ | ○ | ○ | ○ | ○ | ○ | ○ | ○ | ○ | ○ |
| Accelerated weather resistance — Appearance | | ○ | ○ | ○ | ○ | ○ | ○ | ○ | ○ | ○ | X | X | ○ | X |
| Adhesion strength | | ○ | ○ | ○ | ○ | ○ | ○ | ○ | ○ | ○ | Δ | Δ | ○ | ○ |
| Stain resistance | | ○ | ○ | ○ | ○ | ○ | ○ | ○ | ○ | ○ | ○ | ○ | ○ | ○ |
| Drying property | | ○ | ○ | ○ | ○ | ○ | ○ | ○ | ○ | ○ | ○ | ○ | X | ○ |
| Recoatability | | ○ | ○ | ○ | X | X | X | X | ○ | X | ○ | ○ | ○ | ○ |
| Anti-graffiti property | | X | X | X | ○ | ○ | ○ | ○ | X | ○ | X | X | X | X |
| Removability of graffiti | | ○ | ○ | ○ | ○ | Δ | ○ | ○ | ○ | ○ | ○ | ○ | Δ | ○ |
| Comprehensive evaluation | | ○ | ○ | ○ | Δ | Δ | Δ | Δ | ○ | Δ | X | X | X | X |

From Test examples 1 to 3 in Table 1, the ratio of the component (a) to the total of the components (a), (c) and (d) which form the skeleton of the coating film is in the range of 50% to 95%, preferably 60% to 90%. When the content of the component (a) is too large, the resulting coating film lacks the adhesion strength and crack resistance, and when it is too small, uninflammability, hardness and removability of graffiti which are expected in an inorganic coating film cannot be exhibited.

Test example 4 is an example in which 10% of the component (a-2) in Test example 2 was replaced with the component (e-1). It is found that the anti-graffiti property is imparted by adding the component (e-1) of a fluorine-containing silane as the component (e), although the recoatability is sacrificed.

Test example 5 is a case where (b-1) Neostann U-200 in Test example 4 was replaced with a titanium-based catalyst (b-2). The alkali resistance is decreased, and with regard to the removability of graffiti, a trace of graffiti remains only in the case of an oil-based marker. This reason is unclear, however, it is considered that the reason is because an organotin-based catalyst forms a denser network, and a color material does not penetrate in the coating film.

From Test example 6, it is found that even if a glycidyl group-containing silane (d-2) is used instead of the diglycidyl ether of (d-1) and a silicone-based water repellent agent (e-2) is used as the component (e), a similar effect to that in Test example 1 is obtained.

Test example 7 is a case where (c-2) which contains one primary amino group was used. Incidentally, the ratio of the component (c) which reacts with the component (d) is in the range of 0.1 to 2 moles, preferably 1 to 1.5 moles per one glycidyl group. Test example 1 is an example in which the ratio thereof is 1 mole, and Test example 4 is an example in which the ratio thereof is 1.5 moles. In either the case where the ratio thereof is too large or the case where it is too small, a part of the component (c) or the component (d) which is not involved in the skeleton formation remains unreacted, and it may cause a trouble on the coating film.

Test examples 8 and 9 are examples in which a pigment was contained, that is, an enamel was added. Even if an enamel is added, removability of graffiti can be imparted, and by adding one or more compounds of the component (e), an anti-graffiti property can be imparted.

Test example 10 is a comparative example in which the components (c) and (d) which are essential components were not contained, and an example in which as the component (a), (a-1) having an alkoxy group content of 31% was used at 30% and (a-2) having an alkoxy group content of 17% was used at 69%. The resulting coating film is liable to crack and lacks crack resistance.

Test example 11 is a comparative example in which as the component (a), only (a-1) having an alkoxy group content of 31% was used at 69%. The resulting coating film is liable to crack and lacks crack resistance.

Test example 12 is a comparative example in which as the component (a), (a-1) having an alkoxy group content of 31% was used at 5% and (a-2) having an alkoxy group content of 17% was used at 70%. Because the ratio of (a-1) is too small, the drying property, solvent resistance and alkali resistance are poor.

Test example 13 is an example in which the ratio of the component (a) to the total of the components (a), (c) and (d) was set at 94%, and it is found that because the contents of the component (c) and the component (d) are too small, the adhesion strength, crack resistance and alkali resistance are poor.

The invention claimed is:

1. A coating composition comprising the following components (a), (b), (c) and (d) as the essential components:
    (a) a liquid organosiloxane compound which is a mixture of (a-1) a liquid organosiloxane compound having an alkoxy group content of 20 to 60% by mass and (a-2) a liquid organosiloxane compound having an alkoxy group content of 5% by mass or more and less than 20% by mass, wherein an (a-1)/(a-2) mass ratio is 10/90 to 60/40;
    (b) an organometallic catalyst;
    (c) at least one compound selected from among alkoxy group-containing organosilane compounds having a primary or secondary amino group, amino-modified silicone oils, and amino group-containing organosiloxane compounds; and
    (d) at least one compound selected from among compounds having two or more glycidyl groups in one molecule, glycidyl group-containing silane compounds and glycidyl group-containing silicone oligomers.

2. The coating composition according to claim 1, wherein the component (b) is an organotin metallic catalyst.

3. The coating composition according to claim 1, further comprising at least one compound of (e) a compound selected from the group consisting of fluorine-containing silanes, alkylalkoxysilane water repellent agents, silicone oil water repellent agents, and hydroxy-modified silicones; and (f) a compound selected from among titanium oxides, color pigments, extender pigments, thixotropic agents, thickening agents, wetting agents, dispersing agents, antifoaming agents, antifungal agents and antialgal agents in addition to the components (a), (b), (c) and (d).

4. The coating composition according to claim 3, characterized by containing the component (a) at 50 to 90% by mass, the component (b) at 0.1 to 10% by mass, the components (c) and (d) at 5 to 50% by mass, and the component (e) at 1 to 20% by mass.

5. The coating composition according to claim 3, which is a two-liquid type coating composition in which the first liquid contains the component (a) and the component (c), the second liquid contains the component (b) and the component (d), and either the first liquid or the second liquid contains a compound selected from among the component (e) and the component (f).

6. The coating composition according to claim 3, which is a two-liquid type coating composition in which the first liquid contains the component (b) and the component (c), the second liquid contains the component (a) and the component (d), and either the first liquid or the second liquid contains a compound selected from among the component (e) and the component (f).

* * * * *